(12) United States Patent
Sumida

(10) Patent No.: US 7,130,265 B1
(45) Date of Patent: Oct. 31, 2006

(54) DATA MULTIPLEXING DEVICE AND DATA MULTIPLEXING METHOD, AND DATA TRANSMITTER

(75) Inventor: Tetsuo Sumida, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,047

(22) PCT Filed: Nov. 12, 1999

(86) PCT No.: PCT/JP99/06332

§ 371 (c)(1),
(2), (4) Date: Apr. 11, 2001

(87) PCT Pub. No.: WO00/30278

PCT Pub. Date: May 25, 2000

(30) Foreign Application Priority Data

Nov. 12, 1998 (JP) .................. 10-322465

(51) Int. Cl.
*H04L 12/26* (2006.01)
(52) U.S. Cl. .................. 370/229; 370/428; 370/537
(58) Field of Classification Search ........ 370/229–234, 370/395.4–395.43, 395.7–395.72, 412–419, 370/428–429, 537–540; 382/232, 236, 238, 382/240, 248
See application file for complete search history.

(56) References Cited

U.S. PATENT DOCUMENTS

| | | | |
|---|---|---|---|
| 5,140,417 A | * | 8/1992 | Tanaka et al. |
| 5,159,447 A | * | 10/1992 | Haskell et al. ......... 375/240.05 |
| 5,164,939 A | * | 11/1992 | Shobatake .................. 370/416 |
| 5,280,483 A | * | 1/1994 | Kamoi et al. |
| 5,917,954 A | * | 6/1999 | Girod et al. ................ 382/248 |

FOREIGN PATENT DOCUMENTS

| | | | |
|---|---|---|---|
| EP | 0 853 407 A2 | * | 7/1998 |
| JP | 63-181583 | * | 7/1988 |
| JP | 3-22780 | * | 1/1991 |
| JP | 3-96123 | * | 4/1991 |
| JP | 4-94237 | * | 3/1992 |
| JP | 5-235985 | * | 9/1993 |
| JP | 6-350983 | * | 12/1994 |
| JP | 8-98160 | * | 4/1996 |
| JP | 10-200494 | * | 7/1998 |

* cited by examiner

*Primary Examiner*—Chi Pham
*Assistant Examiner*—Thai Hoang
(74) *Attorney, Agent, or Firm*—Frommer Lawrence & Haug LLP; William S. Frommer; Thomas F. Presson

(57) ABSTRACT

A data multiplexing apparatus or the like is suitable for use with a digital satellite broadcasting system or the like. Inputted video data PESa may be converted by a P/S converter (142) in the form of parallel data of byte unit to serial data and then may be written in a buffer (143) and stored therein. Data stored in the buffer may be read out under control of a multiplexing control section (135). The data thus read out may be converted by a S/P converter (144) in the form of serial data to parallel data of byte unit and thereby generated as outputted data PDa. When the data storage quantity of buffer increases, under control of a rate-variable control section (147), a data quantity may be reduced by discarding DCT coefficients of high-orders, for example, with reference to analyzed result of a data analyzing section (146) and thereby the rate may be varied. Thus, the increase of the data storage quantity of buffer can be suppressed and the increase of the delay time caused when inputted data are multiplexed can be avoided. Therefore, there can be prevented a disadvantage such as a failure of synchronization on the receiving side.

18 Claims, 14 Drawing Sheets

| INPUTTED SIGNAL ($a_0$) | CONTROL SIGNAL ($b_0$) | OUTPUTTED SIGNAL |
|---|---|---|
| 0 | 0 | 0 |
| 1 | 0 | 0 |
| 0 | 1 | 0 |
| 1 | 1 | 1 |

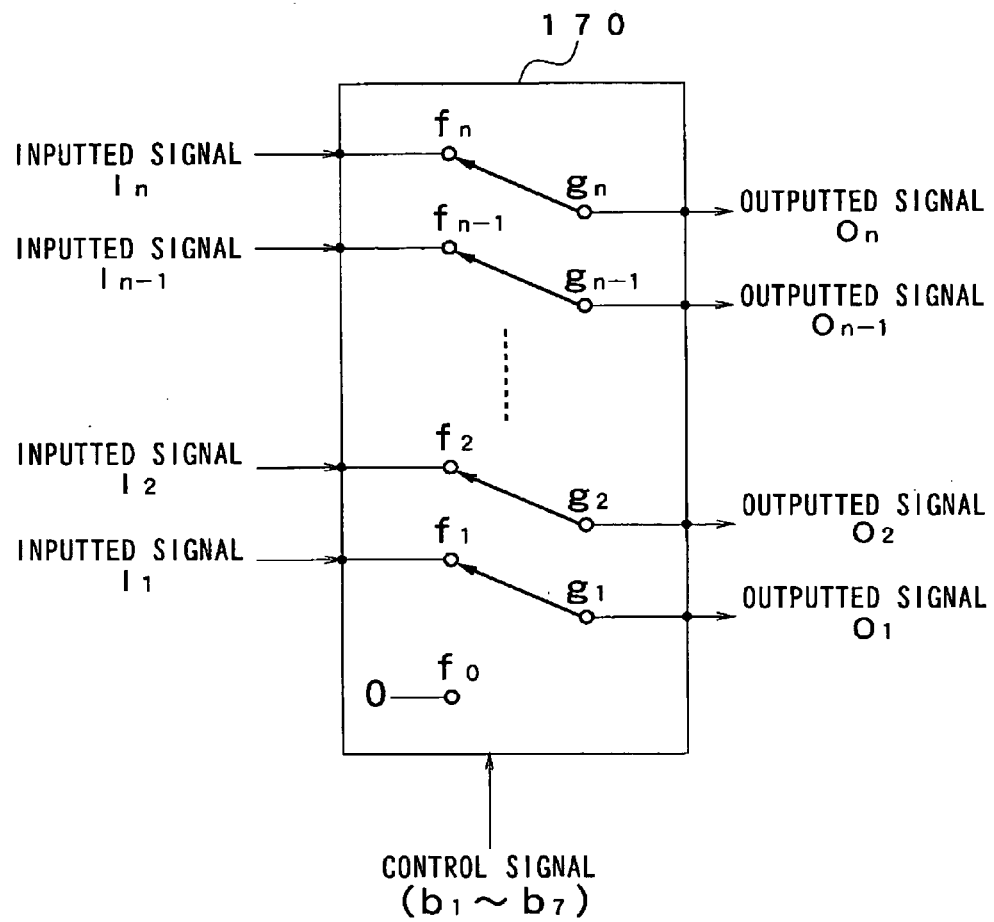

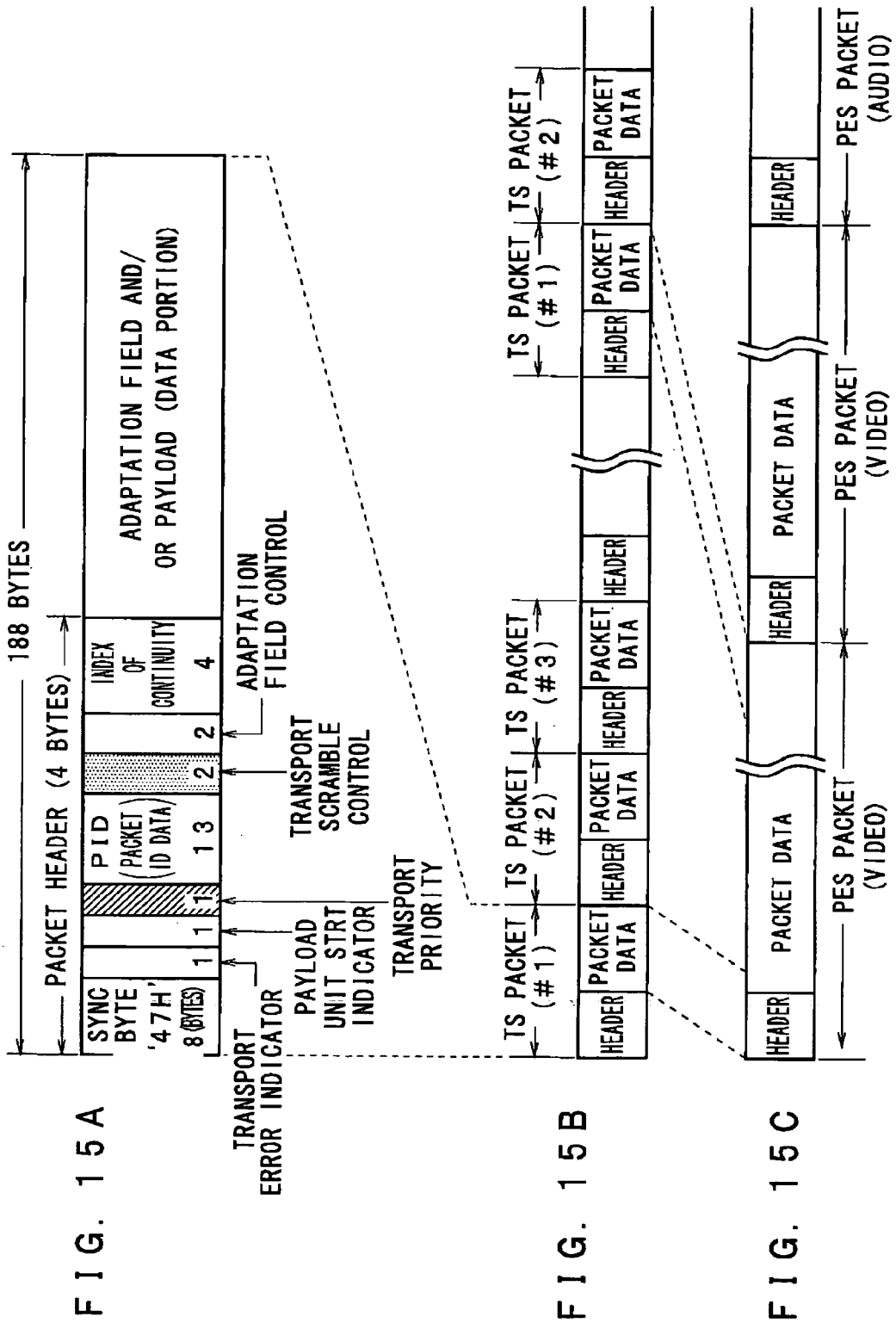

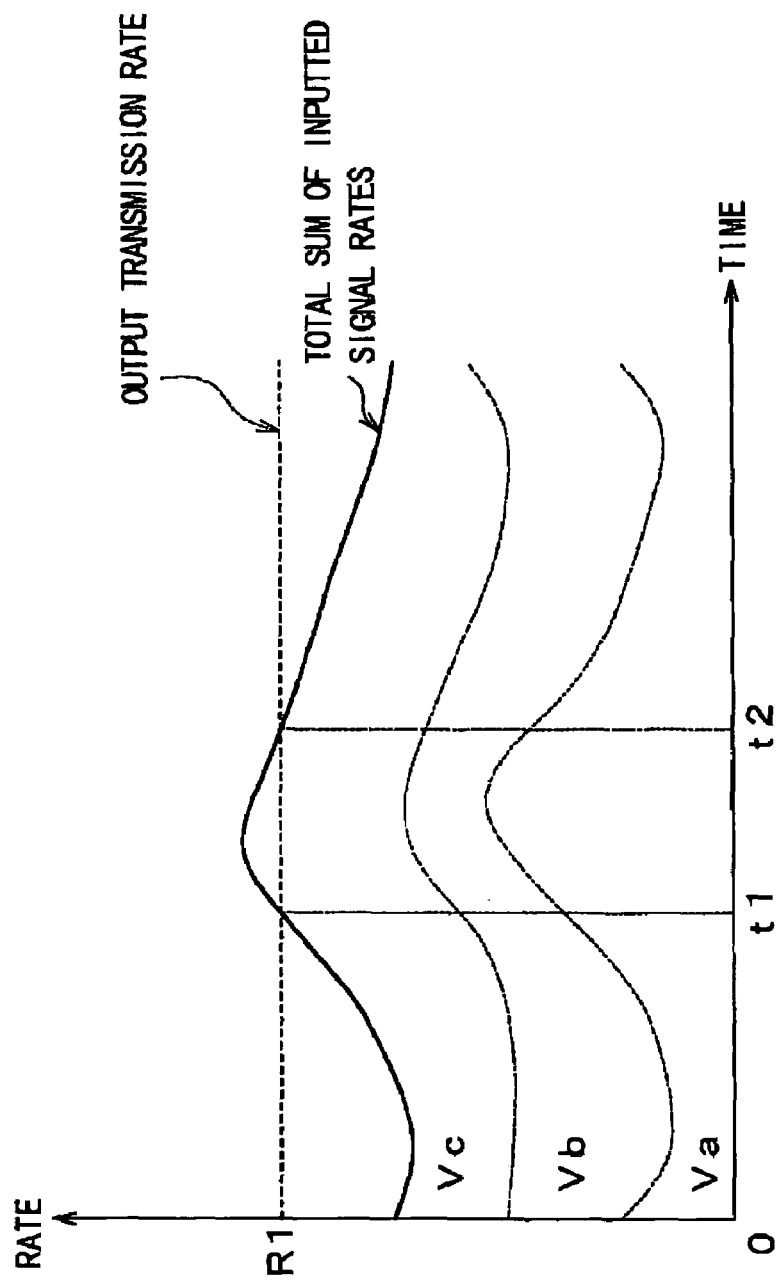

DATA MULTIPLEXING DEVICE AND DATA MULTIPLEXING METHOD, AND DATA TRANSMITTER

TECHNICAL FIELD

This invention relates to a data multiplexing apparatus and a data multiplexing method and a data transmitting apparatus for use with a digital satellite broadcasting system, for example.

BACKGROUND ART

Recently, a digital satellite broadcasting system becomes widespread increasingly. This system may transmit a bit stream obtained when video and audio signals are digitally compression-coded according to the MPEG standard or the like and multiplexed according to the MPEG standard or the like through a satellite. The receiving side may receive such bit steam, separate video and audio data from the received bit stream and decode the resultant bit stream to provide video and audio signals.

As the bit stream, there may be used an MPEG2 (Moving Picture Experts Group 2) transport stream. FIG. 15B shows the MPEG2 transport stream which may comprise a series of 188-byte fixed length transport stream packets (hereinafter referred to as "TS packets") of #1 to #3 programs. Each TS packet may comprise a 4 byte packet header and a 184 byte adaptation field and/or payload as shown in FIG. 15A.

The packet header may comprise a sync byte for detecting the leading portion of the TS packet, PID (Packet Identification: packet identification data) indicative of an attribute of individual stream (data string) of the corresponding packet and adaptation field control information indicating whether this packet has the adaptation field and whether this packet has the payload, or the like. The adaptation field may include added information concerning individual stream and stuffing bytes (invalid data bytes). The payload may comprise video and audio PESs (Packetized Elementary Stream) which are re-divided.

Heretofore, there had been put into practical use the technologies capable of improving a picture quality and a transmission efficiency by processing inputted data at a variable rate. A data multiplexing apparatus is able to multiplex a plurality of variable-rate inputted data by using a technology such as statistical multiplexing. However, because inputted data is processed at the variable rate, there arise various problems such that a delay in the multiplexing is increased by complexity of control and that excessive restrictions are imposed upon the encoder side.

FIG. 16 shows an example of the manner in which a total sum of inputted rates is fluctuated when inputted data concerning video signals Va, Vb, Vc are multiplexed. During a time period ranging from a time t1 to a time t2, the total sum of inputted rates exceeds an output transmission rate R1 so that data obtained in that time period cannot be transmitted or can be transmitted after having delayed within a buffer. When data are allowed to be delayed within the buffer, if the transmission rate is of the fixed transmission rate, then a quantity in which data are stored in the buffer will increase or decrease depending upon a degree in which the input rate can be varied. As a result, in some cases, a delay time required when inputted data are multiplexed increases considerably to cause a synchronization to be failed on the receiving side, which then leads to the interruption of an image and sounds. Therefore, the transmitting side should prevent such accident.

Moreover, when inputted data having priority information are multiplexed, in general, inputted data with a high priority may be multiplexed with a priority and other inputted data are stored in the buffer during that time period. Therefore, in this case, the fluctuation of the quantity in which data are stored in the buffer may become more remarkable.

It is an object of this invention to provide a data multiplexing apparatus or the like in which the increase of the delay time caused when inputted data are multiplexed can be avoided to prevent a disadvantage such as a failure of synchronization on the receiving side.

DISCLOSURE OF THE INVENTION

A data multiplexing apparatus according to this invention comprises a plurality of buffers for respectively storing a plurality of inputted data, a storage quantity detecting means for detecting data storage quantities of a plurality of buffers, an output data generating means for generating a plurality of outputted data by reducing data quantities of data stored in a plurality of buffers and a data multiplexing means for outputting multiplexed data by multiplexing a plurality of outputted data.

Also, a data multiplexing method according to this invention comprises the steps of storing a plurality of inputted data in a plurality of buffers, detecting respectively storage quantities of a plurality of buffers, generating a plurality of outputted data by reducing data quantities of data stored in a plurality of buffers and outputting multiplexed data by multiplexing a plurality of outputted data.

Also, a data transmitting apparatus according to this invention comprises a data multiplexing section for outputting multiplexed data by multiplexing a plurality of inputted data and a data transmitting section for transmitting this multiplexed data, wherein the data multiplexing section comprises a plurality of buffers for respectively storing a plurality of inputted data, a storage quantity detecting means for detecting the data storage quantities of a plurality of buffers, an output data generating means for generating a plurality of outputted data by reducing data quantities of data stored in a plurality of buffers and a data multiplexing means for outputting multiplexed data by multiplexing a plurality of outputted data.

In this invention, a plurality of inputted data are supplied to and written in a plurality of buffers each comprising an FIFO or the like. There can be obtained a plurality of outputted data by reducing data quantities of data stored in a plurality of buffers in response to the respective data storage quantities. In this case, the data reduction quantity may increase as the data storage quantity increases.

Incidentally, the data quantities may be reduced with reference to the data storage quantities, the transmission rate and the priority of inputted data. For example, when the transmission rate is large, the reduction quantity may be decreased. When the transmission rate is small, the reduction quantity may be increased. Also, for example, when the priority is high, the reduction quantity may be decreased. When the priority is low, the reduction quantity may be increased. When the inputted data is data which is compressed by using a discrete cosine transformation, it becomes possible to reduce the data quantity by discarding high-order coefficients of the discrete cosine transformation.

There can be obtained multiplexed data by multiplexing a plurality of outputted data which are obtained by reducing the data quantities as described above. Then, this multiplexed data is transmitted to the receiving side. As described above, a plurality of outputted data are obtained by reducing the data quantities in response to the data storage quantities, whereby the increase of the quantities in which data are stored in the buffers can be suppressed. As a result, the increase of the delay time caused when inputted data are multiplexed can be avoided, and the disadvantage such as a failure of synchronization on the receiving side can be prevented.

BRIEF DESCRIPTION OF DRAWINGS

FIG. 8 is a diagram showing an arrangement of an n-bit switching section provided within the rate converting section.

FIG. 9 is a diagram to which reference will be made in explaining a relationship among respective signals in the n-bit switching section.

FIGS. 15A to 15C are diagrams to which reference will be made in explaining arrangements of TS packets of MPEG2 and PES packets.

FIG. 16 is a diagram to which reference will be made in explaining the manner in which the inputted signal rate is fluctuated when inputted data are multiplexed.

BEST MODE FOR CARRYING OUT THE INVENTION

Figure 1:
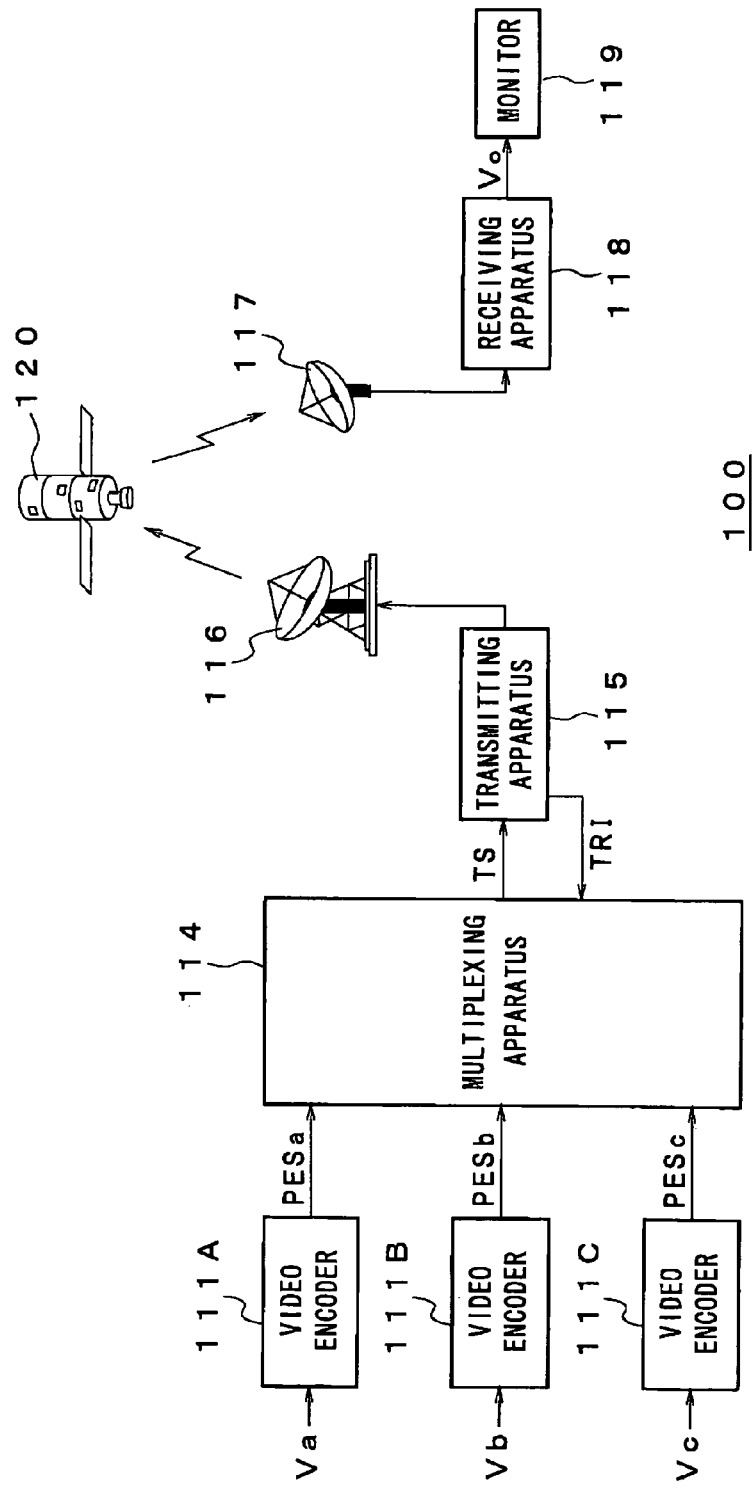
FIG. 1 is a block diagram showing an arrangement of a digital satellite broadcasting system according to a first embodiment.

FIG. 1 shows an arrangement of a digital satellite broadcasting system 100 according to a first embodiment.

This broadcasting system 100 may include video encoders 111A to 111C for compression-coding video signals Va to Vc according to the MPEG standard, respectively, a multiplexing apparatus 114 for outputting a transport stream TS by assembling video data (PES packets of video data) PESa to PESc outputted from the video encoders 111A to 111C and multiplexing these packets, a transmitting apparatus 115 for digitally modulating this transport stream TS and up-converting the modulated transport stream to a predetermined frequency band to provide a broadcasting signal and a transmitting antenna 116 for transmitting this broadcasting signal to a satellite 120.

Incidentally, the video data PESa to PESc are parallel data of byte unit, respectively. Although not shown in FIG. 15B, in actual practice, an 16 byte error-correcting party may be added to each TS packet (188 bytes), and the error-correcting parity may be used to correct errors on the receiving side. Video data PESa to PESc that are reproduced by a reproducing apparatus such as a disc apparatus may be supplied to the multiplexing apparatus 114 instead of the video data PESa to PESc generated by the video encoders 111A to 111C.

Also, the broadcasting system 100 may include a receiving antenna 117 for receiving a broadcasting signal transmitted from the satellite 120, a receiving apparatus 118 for generating a video signal Vo of a predetermined program by demodulating and decoding the broadcasting signal received at this receiving antenna 117 and a monitor 119 for displaying an image based on this video signal Vo.

In the above-mentioned arrangement, the video encoders 111A to 111C on the transmitting side may generate the video data PESa to PESc by compression-coding the video signals Va to Vc, respectively. The video data PESa to PESc may be supplied to the multiplexing apparatus 114. The multiplexing apparatus 114 may assemble the video data PESa to PESc to provide TS packets and then may multiplex these packets to provide an MPEG2 transport stream TS. This transport stream TS may be supplied to the transmitting apparatus 115.

The transmitting apparatus 115 may generate a broadcasting signal by digitally modulating and up-converting the transport stream TS. Then, this broadcasting signal may be supplied to the transmitting antenna 116, and this broadcasting signal may be transmitted from the transmitting antenna 116 to the satellite 120.

Also, the broadcasting signal transmitted from the satellite 120 may be received at the receiving antenna 117 on the receiving side, and the broadcasting signal thus received may be supplied to the receiving apparatus 118. This receiving apparatus 118 may generate the video signal Vo of the predetermined program by demodulating and decoding the received broadcasting signal. Then, this video signal Vo may be supplied to the monitor 119, and the monitor 119 may display the image based on the video signal Vo.

Figure 2:
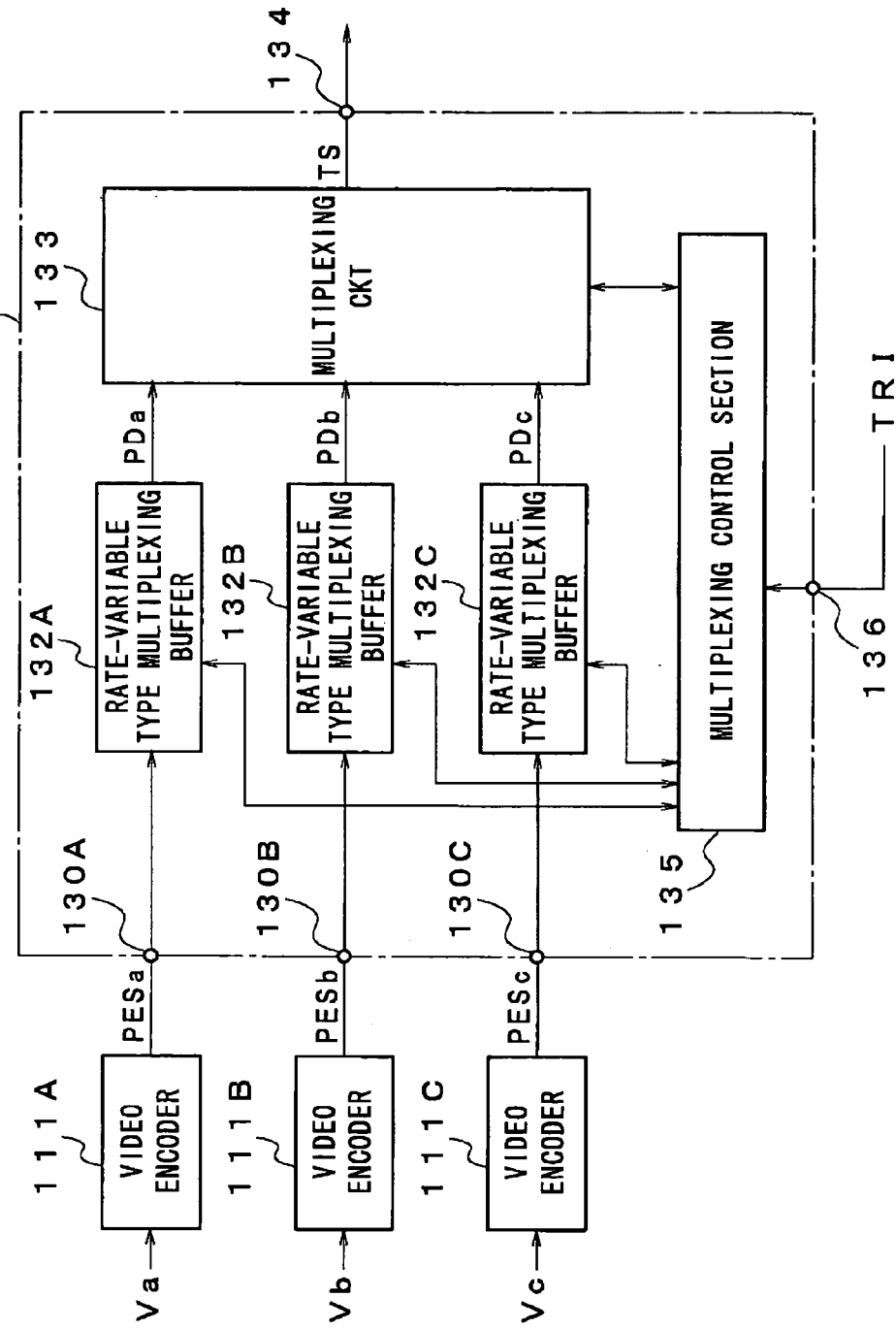
FIG. 2 is a block diagram showing an arrangement of a multiplexing apparatus.

FIG. 2 shows an arrangement of the multiplexing apparatus 114. This multiplexing apparatus 114 may include input terminals 130A to 130C to which the video data PESa to PESc may be inputted from the video encoders 111A to 111C and rate-variable type multiplexing buffers 132A to 132C for sequentially outputting data PDa to PDc comprising the TS packets by writing the video data PESa to PESc in the buffers and reading out the same from the buffers.

Also, the multiplexing apparatus 114 may include a multiplexing circuit 133 which may generate the TS packets by adding the error-correcting parity to the packet headers to the data PDa to PDc after the packet headers were added to the data and which may generate the transport stream TS by multiplexing the TS packets, an output terminal 134 from which the transport stream TS may be outputted, a multiplexing control section 135 for controlling operations of the rate-variable type multiplexing buffers 132A to 132C and the multiplexing circuit 133 and an input terminal 136 to which transmission rate information TRI supplied from the transmitting apparatus 115 may be inputted. The transmission rate information TRI inputted to the input terminal 136 may be supplied to the multiplexing control section 135.

Figure 3:
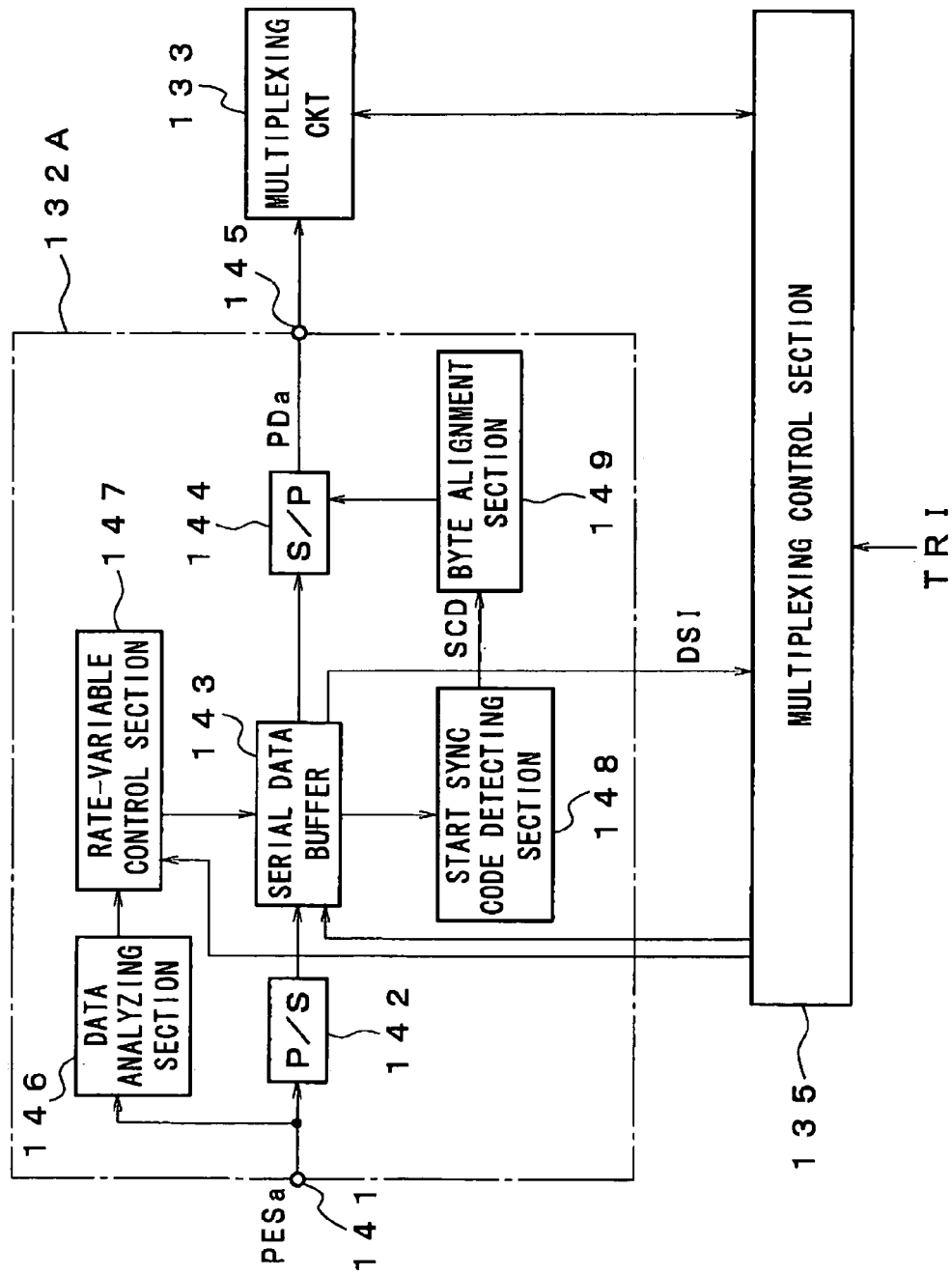
FIG. 3 is a block diagram showing an arrangement of a rate-variable type multiplexing buffer.

FIG. 3 shows an arrangement of the rate-variable type multiplexing buffer 132A. This rate-variable type multiplexing buffer 132A may include an input terminal 141 to which the video data PESa may be inputted, a parallel-to-serial converter (hereinafter referred to as "P/S converter") 142 for converting the video data PESa inputted to this input terminal 141 in the form of parallel data of byte unit to serial data and a serial data buffer 143 for writing and storing the serial data outputted from this P/S converter 142. The buffer 143 may have a data storage quantity detecting function, and detected storage quantity information DSI may be supplied to the multiplexing control section 135.

Also, the rate-variable type multiplexing buffer 132A may include a serial-to-parallel converter (hereinafter referred to as "S/P converter") 144 for converting serial data read out from the serial data buffer 143 into parallel data of byte unit to provide data PDa as outputted data and an output terminal 145 from which the data PDa obtained at this S/P converter 144 may be outputted.

Also, the rate-variable type multiplexing buffer 132A may include a data analyzing section 146 for analyzing the video data PESa inputted to the input terminal 141 and a rate-variable control section 147 which may suppress the data storage quantity of the buffer 143 from being increased by controlling the buffer 143 in response to the increase of the data storage quantity of the buffer 143 under control of the multiplexing control section 135 such that data may be selectively read out from the buffer 143.

Although not described above, the video data PESa might be the PES packet of video data, and image data provided in the payload might be such one that data is processed by a discrete cosine transformation (DCT: discrete cosine transformation) at the block unit of 8 pixels×8 lines, a resultant DCT coefficient is quantized, and the DCT coefficient is variable-length-coded by scanning such as zigzag scanning. The data analyzing section 146 may analyze which portion of the video data PESa, for example, relates to which order of the DCT coefficient. Then, an analyzed result may be supplied from this data analyzing section 146 to the rate-variable control section 147. The rate-variable control section 147 may control the buffer 143 with reference to the analyzed result such that DCT coefficients of high-order may be discarded when stored data may be read out from the buffer. In this case, as the data storage quantity increases, the minimum order of the discarded DCT coefficient is lowered, thereby resulting in the data storage quantity being suppressed from being increased.

Also, the rate-variable type multiplexing buffer 132A may include a start sync code detecting section 148 for detecting a start sync code from data stored in the serial data buffer 143 and a byte alignment section 149 for controlling the S/P converter 144 based on the detected output SCD from the start sync code detecting section 148 such that the data PDa outputted from the S/P converter 144 may complete the byte data in front of the start sync code.

As is well-known, MPEG2 video encoded data may have a hierarchy arrangement ranging from the sequence layer to the block layer. Then, the sync start code is provided at the leading portion of the layer over the slice layer. Each sync code may be formed of 4 bytes, and 3 bytes from the leading portion may be "00 00 01 (H)". Accordingly, the start sync code detecting section 148 may detect the start sync code by detecting the 3-byte portion by a method such as pattern matching.

An operation of the rate-variable type multiplexing buffer 132A shown in FIG. 3 will be described next. The video data PESa inputted to the input terminal 141 may be converted by the P/S converter 142 in the form of parallel data of byte unit to serial data and then supplied to the buffer 143, in which it is written and stored.

Also, the video data PESa inputted to the input terminal 141 may be supplied to the data analyzing section 146 and thereby data may be analyzed. The data analyzing section 146 may analyze which portion of the video data PESa relates to which order of DCT coefficient. The analyzed result may be supplied to the rate-variable control section 147.

The data stored in the buffer 143 may be read out from the buffer under control of the multiplexing control section 135. In this case, although the reading of data stored in the buffer 143 may be limited in consideration of a balance between the reading of data stored in other rate-variable type multiplexing buffers 132B, 132C and a transmission rate indicated by the transmission rate information TRI, when the data storage quantity of the buffer 143 increases, stored data may be selectively read out under control of the rate-variable control section 147 with reference to the analyzed result of the data analyzing section 146, thereby resulting in the data quantity being reduced. For example, the data quantity can be reduced by discarding the DCT coefficients of high-orders. In this case, the minimum order of DCT coefficient may be lowered as the data storage quantity increases. Thus, the increase of the data storage quantity of the buffer 143 can be suppressed, and the increase of the delay time caused when inputted data are multiplexed can be avoided.

The S/P converter 144 may convert the data read out from the buffer 143 in the form of serial data to parallel data of byte unit to provide the data PDa. This data PDa may be led out to the output terminal 145. In this case, the start sync code of the MPEG2 encoded code may be detected from the data stored in the buffer 143. The byte alignment section 149 may control the operation of the S/P converter 144 based on the detected output SCD. Consequently, the data PDa outputted from the S/P converter 144 may be such that byte data may be completed in front of each start sync code.

Referring back to FIG. 2, although not described in detail, the rate-variable type multiplexing buffers 132B, 132C also may be arranged similarly to the above-mentioned rate-variable type multiplexing buffer 132A and operated similarly, thereby resulting in the data PDb, PDc being outputted sequentially.

An operation of the multiplexing apparatus 114 shown in FIG. 2 will be described. The video data PESa may be supplied from the input terminal 130A to the rate-variable type multiplexing buffer 132A, and data PDa comprising the TS packets may be sequentially outputted from this rate-variable type multiplexing buffer 132a. Also, the video data PESb may be supplied from the input terminal 130B to the rate-variable type multiplexing buffer 132B, and data PDb comprising the TS packets may be sequentially outputted from this rate-variable type multiplexing buffer 132b. Further, the video data PESc may be supplied from the input terminal 130C to the rate-variable type multiplexing buffer 132C, and the data PDc comprising the TS packets may be sequentially outputted from this rate-variable type multiplexing buffer 132C.

The data PDa to PDc outputted from the rate-variable type multiplexing buffers 132A to 132C may be supplied to the multiplexing circuit 133. This multiplexing circuit 133 may generate TS packets by adding the packet header and the error-correcting parity to the data PDa to PDc. Also, the multiplexing circuit 133 may generate the transport stream TS by multiplexing TS packets generated from the data PDa to PDc. This transport stream TS may be led out to the output terminal 134.

As described above, according to the first embodiment, in the rate-variable type multiplexing buffers 132A to 132C (see FIG. 3) of the multiplexing apparatus 114, the stored data may be selectively read out from the serial data buffer 143 in response to the data storage quantity. For example, when the data storage quantity increase, the data quantity may be reduced by discarding the DCT coefficients of high-order. Thus, even when the video data PESa to PESc are of the variable-rate video data, the increase of the data storage quantity of the buffer 143 can be suppressed, and the increase of the delay time caused when inputted data are multiplexed can be avoided, thereby making it possible to prevent a disadvantage such as a failure of synchronization on the receiving side.

Figure 4:
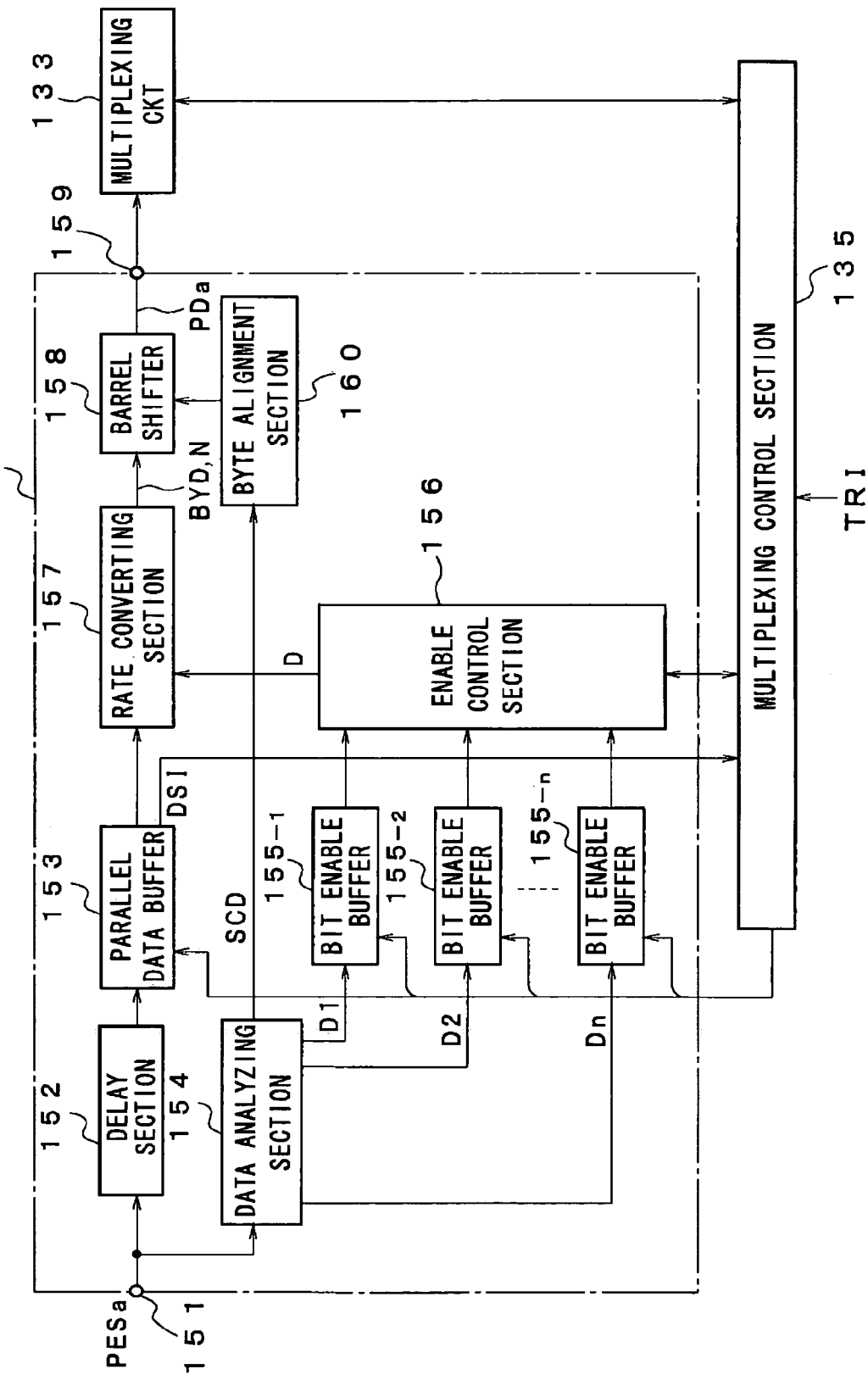
FIG. 4 is a block diagram showing other arrangement of the rate-variable type multiplexing buffer.

Incidentally, the rate-variable type multiplexing buffers 132A to 132C need not always be arranged as shown in FIG. 3 but can be arranged as shown in FIG. 4. A rate-variable type multiplexing buffer 132A' shown in FIG. 4 will be described.

This rate-variable type multiplexing buffer 132A' may include an input terminal 151 to which the video data PESa may be inputted, a time-adjustment delay section 152 for delaying the video data PESa inputted to this input terminal 151 by a predetermined time and a parallel data buffer 153 in which the video data PESa delayed by the delay section 152 may be written and stored. The buffer 153 may have a data storage quantity detecting function, and storage quantity information DSI may be supplied to the multiplexing control section 135.

Also, the rate-variable type multiplexing buffer 132A' may include a data analyzing section 154 for generating bit enable data D1 to Dn indicative of validity or invalidity of bit data of each byte of the video data PESa stored in the above-mentioned buffer 153 in response to a plurality of (n) data reduction ratios by analyzing the video data PESa supplied to the input terminal 151 and which may detect the start sync code from the video data PESa by a method such as pattern-matching and a plurality of bit enable buffers 155-1 to 155-n in which data D1 to Dn may be written at the byte unit and stored.

In the data D1 to Dn, "1", for example, assumes validity and "0" assumes invalidity. Also, the data analyzing section 154 may analyze which portion of the video data PESa, for example, relates to which order of the DCT coefficient, and may generate the data D1 to Dn in response to a plurality of data reduction ratios such that the DCT coefficient portions higher than a predetermined order in the video data PESa may be made invalid. In this case, as the data reduction ratio becomes high, the minimum order of the DCT coefficient which will be made invalid is lowered.

Also, the rate-variable type multiplexing buffer 132A' may include an enable control section 156 for selectively outputting any one of the data D1 to Dn read out from the buffers 155-1 to 155-n in response to the data storage quantity under control of the multiplexing control section 135 and a rate converting section 157 for discarding invalid bit data from the bit data of each byte of the video data PESa read out from the buffer 153 by using the bit enable data D outputted from the enable control section 156.

Incidentally, data may be read out from the buffer 153 under control of the multiplexing control section 135. Data may be written in and read out from the buffers 155-1 to 155-n in response to the manner in which data may be written and read out from the buffer 153. The delay time of the delay section 152 may be set in such a manner that the bit enable data D corresponding to the bit data of each byte of the video data PESa supplied to the buffer 153 may be supplied to the rate converting section 157.

Also, the rate-variable type multiplexing buffer 132A' may include a barrel shifter 158 for generating the data PDa as outputted data by converting data outputted from the rate converting section 157, i.e. valid bit data of each byte of the video data PESa into parallel data of byte unit, an output terminal 159 from which the data PDa may be outputted and a byte alignment section 160 for controlling the operation of the barrel shifter 158 on the basis of the detected output SCD of the start sync code from the data analyzing section 154 such that the data PDa outputted from the barrel shifter 158 may complete the byte data in front of the start sync code.

As described above, the rate converting section 157 may discard invalid bit data from bit data of each byte of the video data PESa. To be concrete, the rate converting section 157 may generate byte data in which valid bit data are aligned to the MSB (most significant bit) side in response to each byte data of the video data PESa and other bit data are set to "0" and valid bit data length information N. The barrel shifter 158 may generate parallel data of byte unit by using the byte data BYD and the data length information N supplied from the rate converting section 157.

Figure 5:
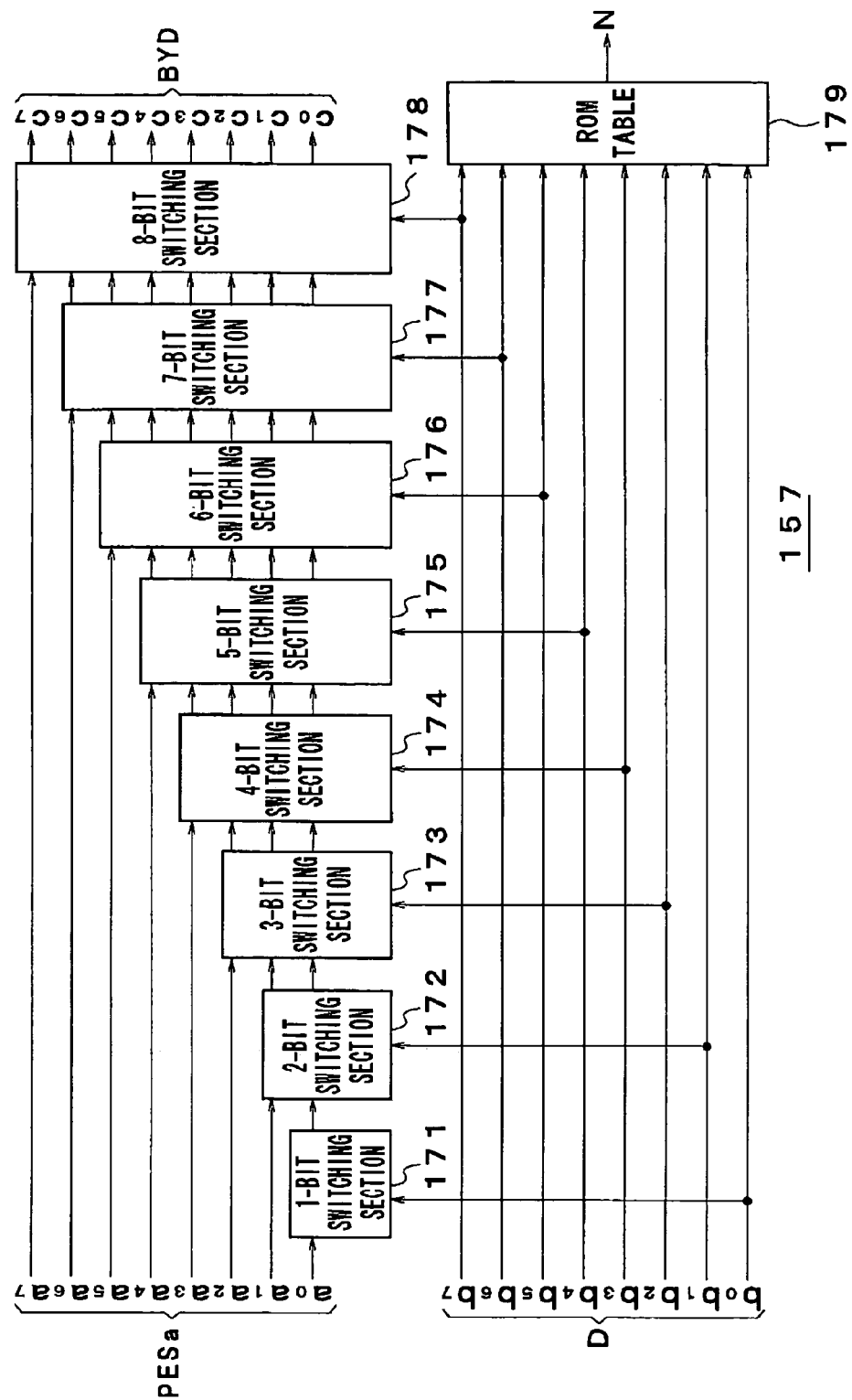
FIG. 5 is a block diagram showing an example of an arrangement of a rate converting section provided within the rate-variable type multiplexing buffer.

FIG. 5 shows an example of an arrangement of the rate converting section 157. This rate converting section 157 may comprise a 1-bit switching section 171 to an 8-bit switching section 178 and a ROM table 179. Bit data of each byte of the video data PESa assume a7 to a0, and bit data of each bit enable data D of the byte unit assume b7 to b0.

The bit data a0 may be supplied to the 1-bit switching section 171 as the inputted signal and the bit data b0 may be supplied thereto as the control signal. Output signals from the 1-bit switching section 171 to the 7-bit switching section 177 and the bit data a1 to a7 may be supplied to the 2-bit switching section 172 to the 8-bit switching section 178 as the inputted signals and the bit data b1 to b7 may be supplied thereto as the control signals. Then, the 8-bit switching section 178 may output the byte data BYD (c7 to c0). The bit data b7 to b0 may be supplied to the ROM table 179 as the inputted signals and the ROM table 179 may generate the data length information N indicating the number of "1" of the bit data b7 to b0.

Figures 6, 7:
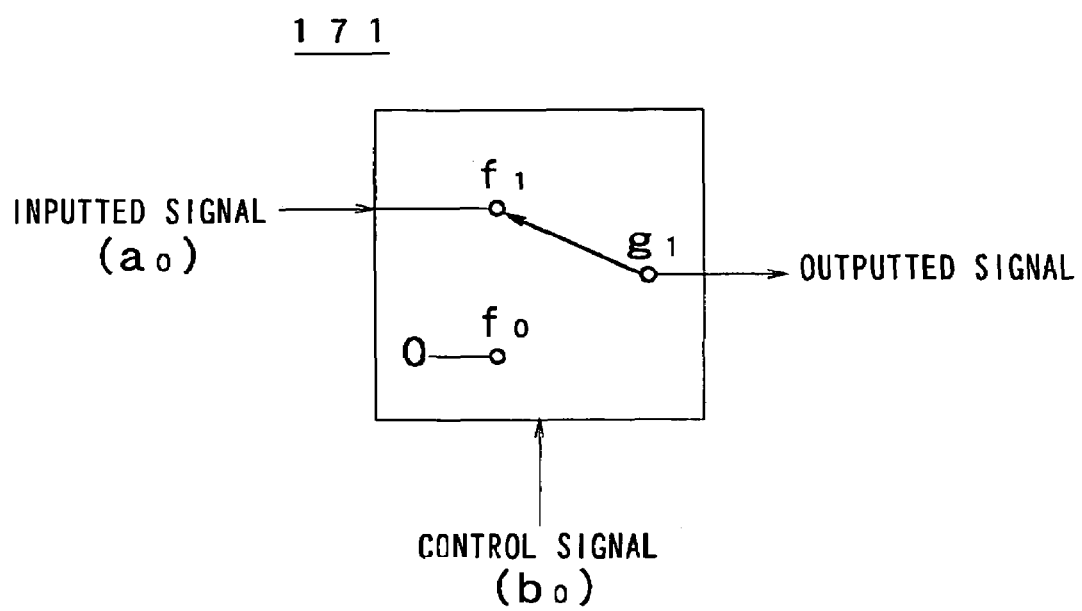
FIG. 6 is a diagram showing an arrangement of a 1-bit converting section provided within the rate converting section.
FIG. 7 is a diagram to which reference will be made in explaining a relationship among respective signals in the 1-bit switching section.

FIG. 6 shows an arrangement of the 1-bit switching section 171. This 1-bit switching section 171 may be a change-over switch including two fixed terminals f0, f1 and a movable terminal g1. "0" may be supplied to the fixed terminal f0 and the inputted signal a0 may be supplied to the fixed terminal f1 so that the outputted signal may be outputted from the movable terminal g1. When the control signal b0 is held at "1", the movable terminal g1 may be connected to the fixed terminal f1 to thereby output the inputted signal a0 as the outputted signal. When on the other hand the control signal b0 is held at "0", the movable terminal g1 may be connected to the fixed terminal f0 to thereby output "0" as the outputted signal. FIG. 7 shows a relationship among the respective signals in the 1-bit switching section 171.

FIG. 8 shows an arrangement of an n (n=2 to 8) bit switching section 170. This n-bit switching section 170 may be a change-over switch having (n+1) fixed terminals f0, f1, f2, ..., fn−1, fn and n movable terminals g1, g2, ..., gn−1, gn. "0" may be supplied to the fixed terminal f0, the inputted signals I1, I2, ..., In−1, In may be supplied to the fixed terminals f1, f2, . . . , fn−1, fn, and outputted signals O1, O2, . . . , On−1, On may be outputted from the movable terminals g1, g2, . . . , gn−1, gn.

When the above-mentioned switching section may be the 2-bit switching section 172, it may be a change-over switch having three fixed terminals f0, f1, f2 and two movable terminals g1, g2. Then, "0" may be supplied to the fixed terminal f0, the outputted signal of the 1-bit switching section 171 may be supplied to the fixed terminal f1 as the inputted signal I1, the signal a1 may be supplied thereto as the inputted signal I2, and the outputted signals O1, O2 may be outputted from the movable terminals g1, g2.

Also, when the above-mentioned switching section may be the 8-bit switching section 178, for example, it may be the change-over switch having 9 fixed terminals f0, f1, f2, . . . , f8 and 8 movable terminals g1, g2, . . . , g8. Then, "0" may be supplied to the fixed terminal f0, the outputted signals O1, O2, . . . , O7 of the 7-bit switching section 171 may be supplied to the fixed terminals f1, f2, . . . , f7 as the inputted signals I1, I2, . . . , I7, the signal a7 may be supplied thereto as the inputted signal I8 and outputted signals O1, O2, . . . , O8 comprising byte data BYD [c0 to c7] may be outputted from the movable terminals g1, g2, . . . , g8.

When the control signal is held at "1", the movable terminals g1, g2, . . . , gn−1, gn may be respectively connected to the fixed terminals f1, f2, . . . , fn−1, fn, whereby the inputted signals I1, I2, . . . , In−1, In may be outputted as the outputted signals O1, O2, . . . , On−1, On as they are. When on the other hand the control signal is held at "0", the movable terminals g1, g2 . . . , gn−1, gn may be respectively connected to the fixed terminals f0, f1, . . . , fn−2, fn−1, whereby the signal "0" may be outputted as the outputted signal O1 and the inputted signals I1, . . . , In−2, In−1 may be outputted as the outputted signals O2, . . . , On−1, On, respectively. FIG. 9 shows a relationship among respective signals in the n-bit switching section 170 where I0="0".

Figure 10:
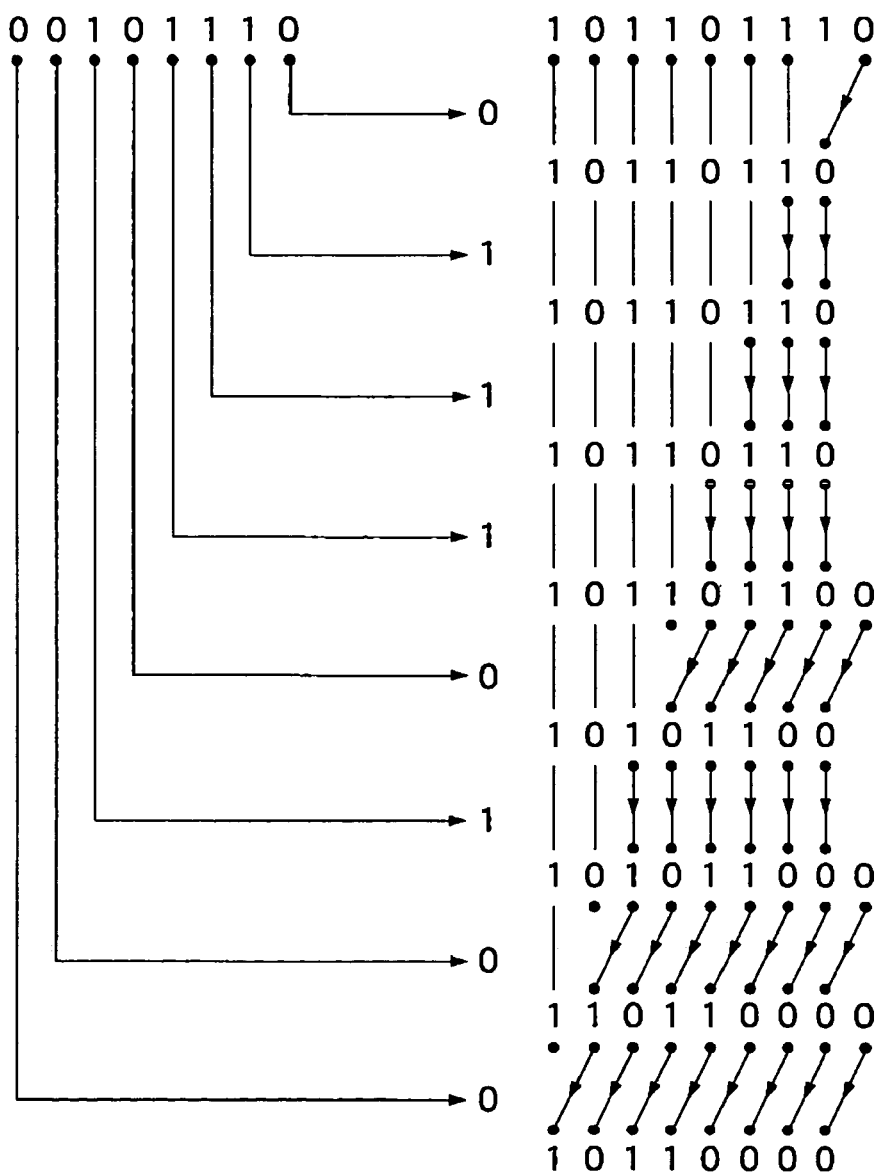
FIG. 10 is a diagram to which reference will be made in explaining the manner in which the rate converting section is operated.

FIG. 10 shows an example of the manner in which the rate converting section 157 may generate byte data BYD. This example assumes that bit data [a7 to a0] of the video data PESa are [10110111] and that bit data [b7 to b0] of the bit enable data D are [00101110]. In this example, [1011000] may be generated as the byte data BYD [c7 to c0]. This data might be such data in which valid bit data of the bit data [a7 to a0] are aligned to the MSB side and other bit data are set to "0". In the case of this example, the data length information N outputted from the ROM table 179 may indicate 4.

Figure 11:
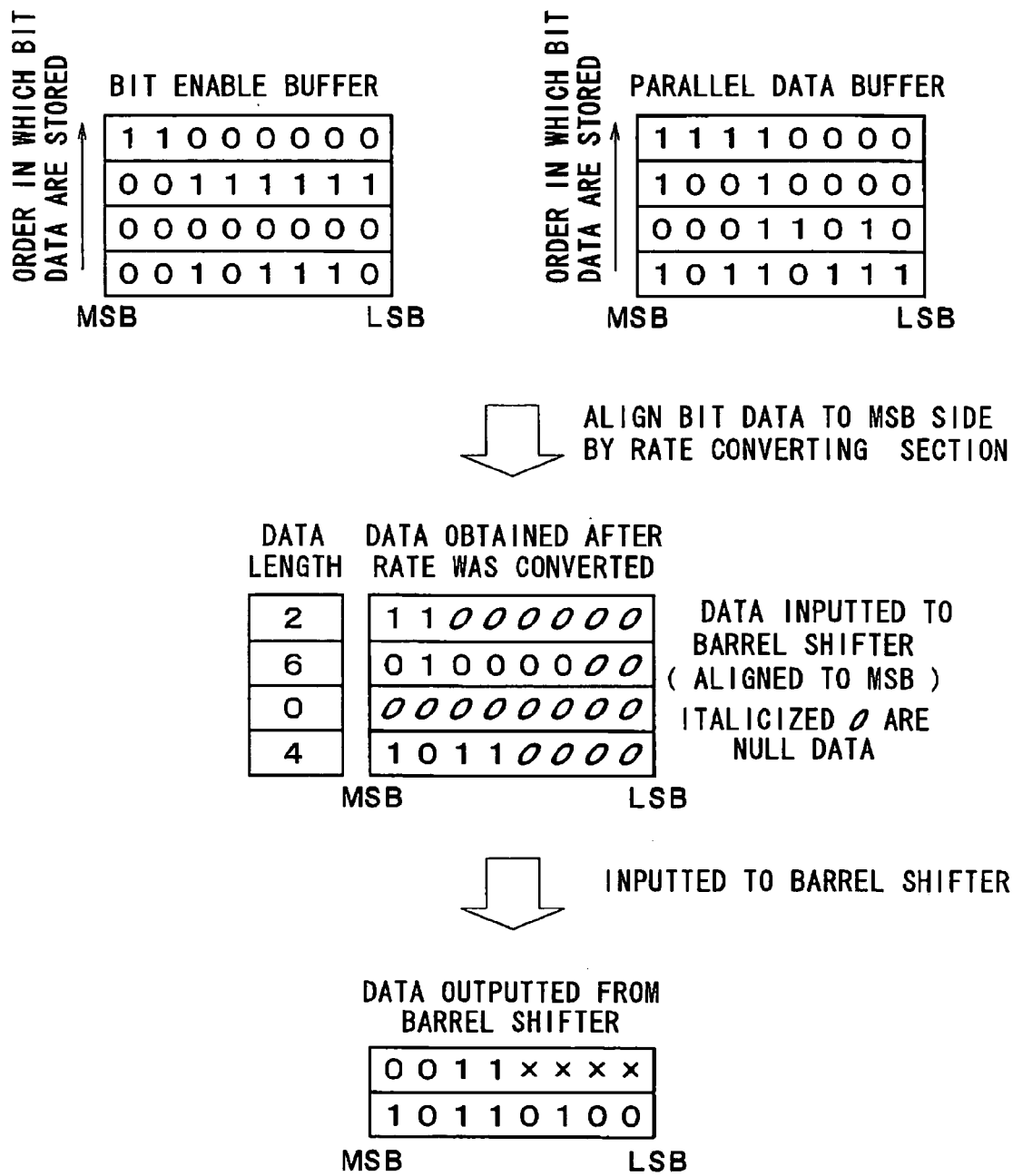
FIG. 11 is a diagram to which reference will be made in explaining the manner in which the rate converting section and the barrel shifter are operated.

FIG. 11 shows examples of data stored in the bit enable buffer and the parallel data buffer 153 selected by the enable control section 156, data outputted from the rate converting section 157 and data outputted from the barrel shifter 158.

An operation of the rate-variable type multiplexing buffer 132A' shown in FIG. 4 will be described next. The video data PESa inputted to the input terminal 151 may be supplied through the delay section 152 to the parallel data buffer 153, in which it may be written at the byte unit and stored. Also, the video data PESa inputted to the input terminal 151 may be supplied to and analyzed by the data analyzing section 154. Then, this data analyzing section 154 may generate the bit enable data D1 to Dn indicative of validity or invalidity of bit data of each byte of the video data PESa stored in the above-mentioned buffer 153 in response to a plurality of (n) data reduction ratios.

The data analyzing section 154 may analyze which portion of the video data PESa, for example, may concern which order of the DCT coefficient, and may generate the data D1 to Dn in response to a plurality of data reduction ratios such that the portions of DCT coefficients higher than the predetermined order in the video data PESa may be made invalid. The data enable data D1 to Dn may be supplied to the bit enable buffers 155-1 to 155-n, in which they are written at the byte unit and stored.

The data stored in the buffer 153 and the bit enable data of the buffers 155-1 to 155-n may be read out in synchronism with each other under control of the multiplexing control section 135. Then, any one of the data D1 to Dn read out respectively from the buffers 155-1 to 155-n may be selected by the enable control section 156 and then fed to the rate converting section 157.

The rate converting section 157 may discard invalid bit data from the bit data of each byte of the video data PESa read out from the buffer 153 by using the bit enable data D outputted from the enable control section 156. That is, the rate converting section 157 may generate the byte data BYD in which valid bit data are aligned to the MSB side in response to each byte data of the video data PESa and the valid bit data length information N.

The byte data BYD and the valid bit data length information N generated from the rate converting section 157 may be supplied to the barrel shifter 158. This barrel shifter 158 may convert the valid bit data of each byte of the video data PESa into parallel data of byte unit based on the byte data BYD and the data length information N to output the data PDa as outputted data. Then, this data PDa may be led out to the output terminal 159.

The data analyzing section 154 may detect the start sync code of the MPEG2 encoded data from the video data PESa, and the byte alignment section 160 may control the operation of the barrel shifter 158 on the basis of the detected output SCD. Thus, the data PDa outputted from the barrel shifter 158 may complete the byte data in front of each start sync code.

Although not described above, while the reading of data stored in the buffer 153 may be limited in consideration of a balance between the reading of data stored in other rate-variable type multiplexing buffers and the transmission rate indicated by the transmission rate information TRI, when the data storage quantity of the buffer 153 increases, under control of the multiplexing control section 153, the enable control section 156 may select bit enable data with a high data reduction ratio, thereby resulting in the data quantity being reduced. In this case, the bit enable data with higher data reduction ratio may be selected as the increase of the data storage quantity becomes large. Thus, the increase of the data storage quantity of the buffer 153 can be suppressed, and the increase of the delay time caused when inputted data are multiplexed can be avoided.

As described above, in the rate-variable type multiplexing buffer 132A' shown in FIG. 4, the enable control section 156 may select the bit enable data with the predetermined data reduction ratio in response to the storage quantity of the parallel data buffer 153, and the rate converting section 157 may selectively discard bit data. For example, when the data storage quantity increases, the data quantity can be reduced by discarding DCT coefficients of high-order. Accordingly, even when the video data PESa is of the variable rate video data, the increase of the data storage quantity of the buffer 153 can be suppressed and the increase of the delay time caused when inputted data are multiplexed can be avoided. Thus, it is possible to prevent a disadvantage such as a failure of synchronization on the receiving side. Also, as compared with the rate-variable type multiplexing buffer 132A shown in FIG. 3, the P/S converter and the S/P converter can be eliminated and hence the scale of hardware can be reduced.

Figure 12:
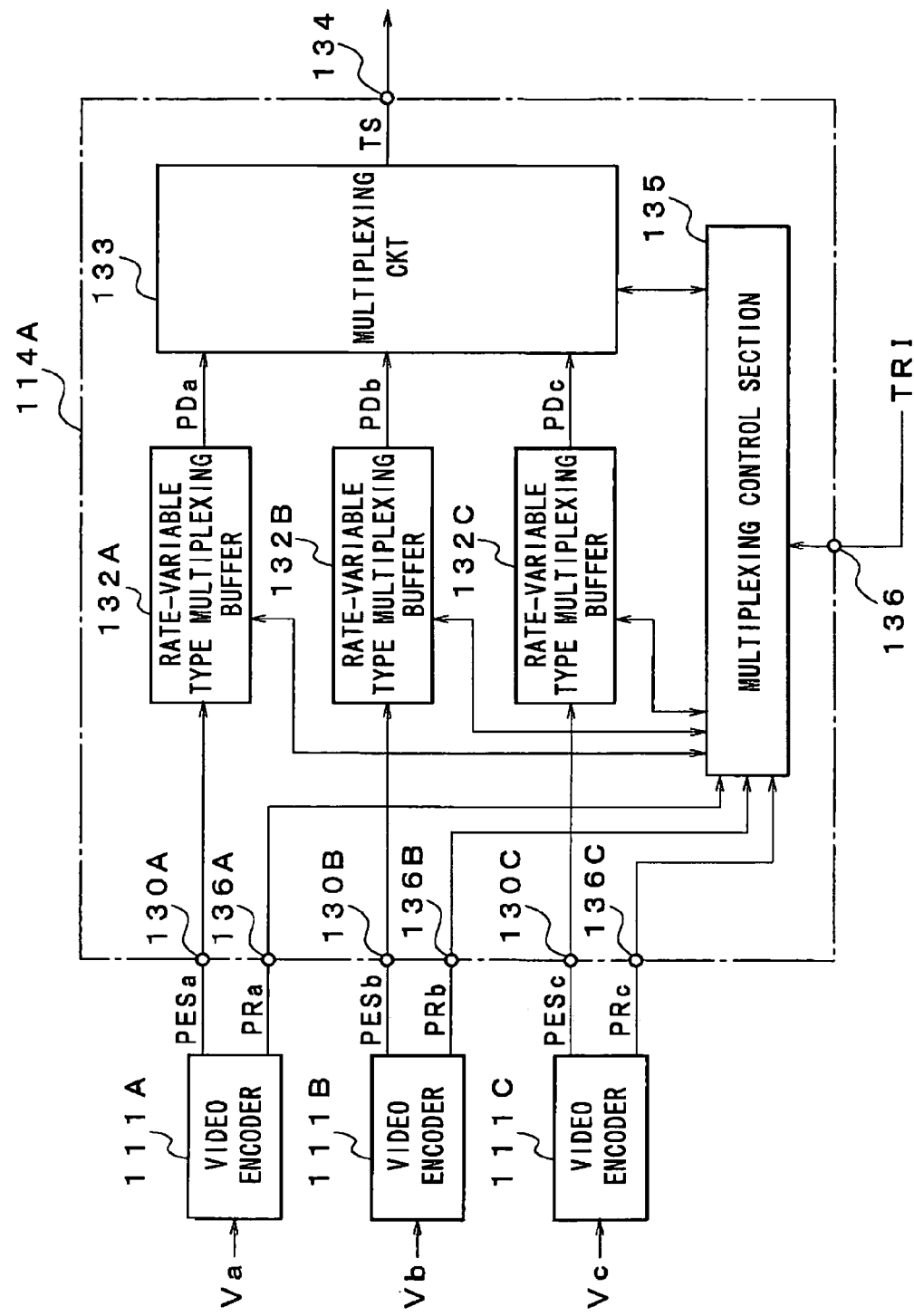
FIG. 12 is a block diagram showing an arrangement of a multiplexing apparatus according to a second embodiment.

A second embodiment according to this invention will be described next. FIG. 12 shows an arrangement of a multiplexing apparatus 114A according to the second embodiment. In FIG. 12, elements and parts corresponding to those of FIG. 2 are marked with the same reference numerals, and therefore need not be described in detail.

This multiplexing apparatus 114A may include input terminals 136A to 136C to which priority information PRa to PRc outputted from the video encoders 111A to 111C may be inputted, respectively. Then, the priority information PRa to PRc inputted to the input terminals 136A to 136C may be supplied to the multiplexing control section 135.

The multiplexing control section 135 may control not only the increase of the data storage quantities of the data buffers within the respective rate-variable type multiplexing buffers 132A to 132C but also the data reduction quantities in the respective rate-variable type multiplexing buffers 132A to 132C based on the priority information PRa to PRc so that an output rate of the transport stream TS outputted from the multiplexing circuit 133 (hereinafter simply referred to as "output rate") may be matched to a transmission rate indicated by the transmission rate information TRI.

A rest of the multiplexing apparatus 114A shown in FIG. 12 is arranged similarly to the multiplexing apparatus 114 shown in FIG. 2, and is operated similarly. While the priority information may be inputted to the multiplexing apparatus 114A independently of the video data PESa to PESc as described above, the present invention is not limited thereto and video data PESa to PESc which contain the priority information PRa to PRc may be inputted to the multiplexing apparatus. In that case, the multiplexing apparatus needs a separating section for separating the priority information PRa to PRc from the video data PESa to PESc.

Figure 13:
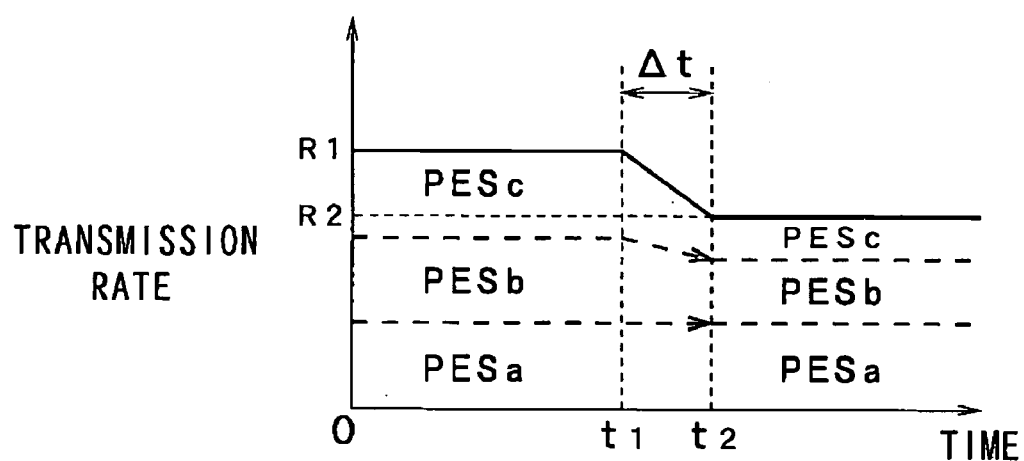
FIG. 13 is a diagram to which reference will be made in explaining the manner in which rates are varied by using priority information.

FIG. 13 shows an example of the manner in which the multiplexing apparatus 114A shown in FIG. 12 is operated. In this example, the rates of the video data PESa to PESc are assumed to be the same fixed rates and R1 assume the total sum of rates. Also, it is assumed that the initial transmission rate and other data and redundant data are not multiplexed with each other. Then, the priority of the video data PESa to PESc is assumed to be PESa>PESb>PESc, and the video data PESa has the highest priority.

When the transmission rate is varied from R1 to R2 on the multiplexing apparatus 114A at a time t1, the multiplexing apparatus 114A may vary the transmission rate by reducing the data quantities of the video data PESa to PESc in response to the priority information PRa to PRc. Then, under control, the output rate may be matched with the transmission rate R2 at a time t2 by matching the output rate with the transmission rate R2. In this example, the data quantity of the video data PESc with the lowest priority may be reduced most. Thus, it is possible to prevent the quality of the video data PESa with the high priority from being deteriorated.

Assuming that Δt(=t2−t1) represents a time required to vary the rate, then when there is used a method of feeding the rate change back to each encoder, the video encoder cannot cope with the rate change until the transmission of data stored in the buffer on the encoder side is completed. Even the MPEG2 variable-rate encoder requires a time longer than a slice layer unit (about 1.1 ms in the NTSC system) in order to vary the rate. The delay of such control may cause extra data to be generated depending upon a difference between inputted and outputted rates in the multiplexing apparatus.

Although extra data may be stored in the buffer and it seems that such extra data may be absorbed, such extra data may appear in the form of the increase of the delay amount of the data itself. This increase of the delay amount may become a factor which causes a synchronization to be failed on the receiving side. During the time period Δt, since the multiplexing apparatus 114A shown in FIG. 12 may change the rate by reducing the data quantities within the respective rate-variable type multiplexing buffers 132A to 132C real time, the delay time of the data itself becomes a very small time period of approximately a processing clock unit (less than 1 μs). Therefore, there may not arise a problem at all due to the delay of data within the respective variable-rate type multiplexing buffers 132A to 132C.

Figure 14:
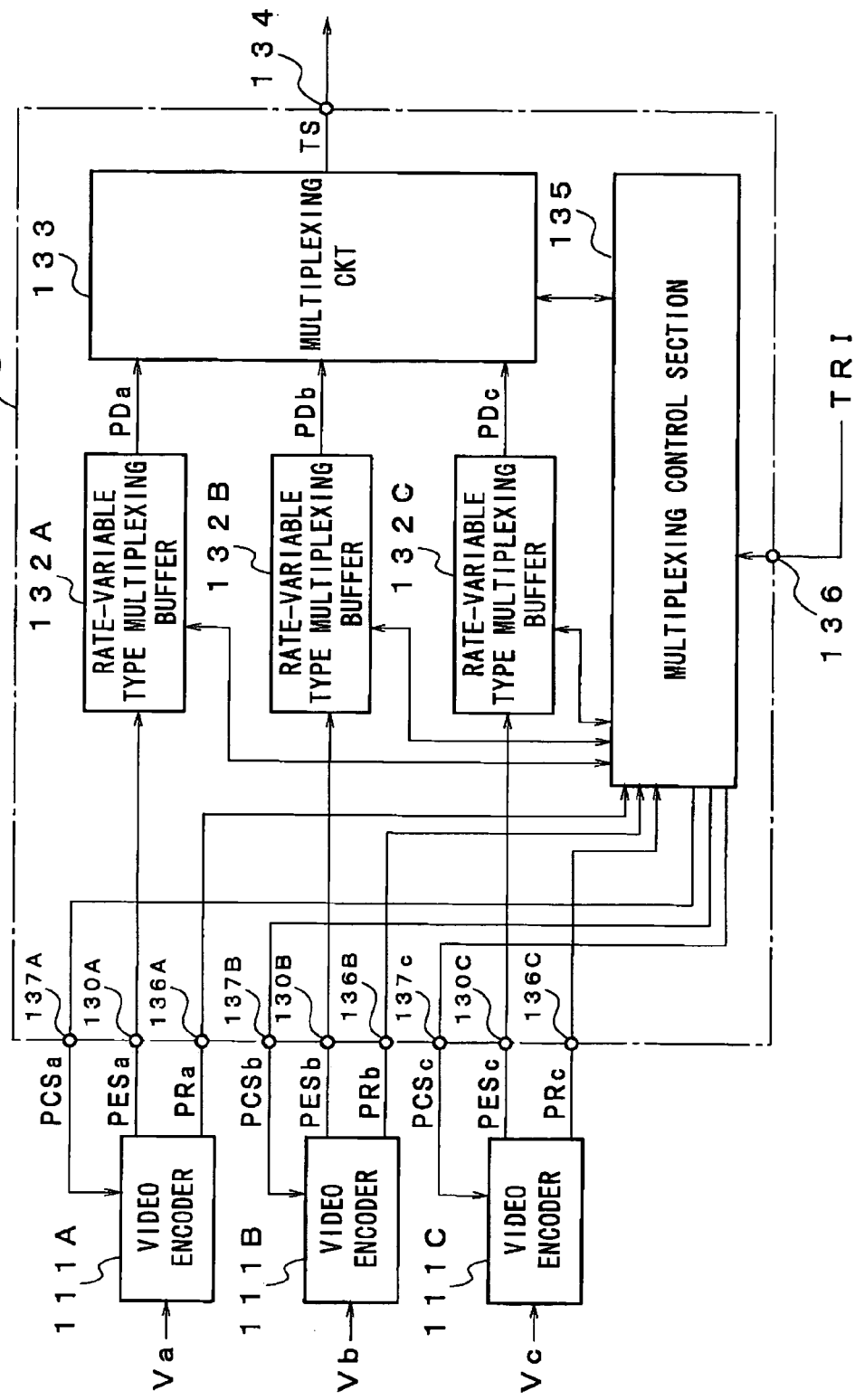
FIG. 14 is a block diagram showing an arrangement of a multiplexing apparatus according to a third embodiment.

A third embodiment according to this invention will be described next. FIG. 14 shows an arrangement of a multiplexing apparatus 114B according to the third embodiment. In FIG. 14, elements and parts corresponding to those of FIG. 12 are marked with the same reference numerals and therefore need not be described in detail. This multiplexing apparatus 114B is able to convert the rate as its own function and may further include means for feeding the rate change back to each encoder.

This multiplexing apparatus 114B may include output terminals 137A to 137C from which rate control signals RCSa to RCSc outputted from the multiplexing control section 135 may be outputted. Then, the rate control signals RCSa to RCSc outputted to the output terminals 137A to 137C may be supplied respectively to the video encoders 111A to 111C.

In this case, until the video encoders 111A to 111C complete the rate change, in order to prevent the delay amount of data from being increased, the multiplexing apparatus 114B may change the rate by reducing the data quantities within the respective rate-variable type multiplexing buffers 132A to 132C. Of course, if the rate change is completed in the video encoders 111A to 111C, then at the time point in which the rate change is finished, the total sum of inputted rates of the video data PESa to PESc supplied to the multiplexing apparatus 114B may be matched with the transmission rate with the result that the rate is not varied in the multiplexing apparatus 114B.

According to this invention, a plurality of outputted data may be obtained by effecting a data quantity reduction processing on data stored in a plurality of buffers in response to each data storage quantity, and multiplexed data may be obtained by multiplexing a plurality of outputted data. Therefore, the increase of the delay time caused when inputted data are multiplexed can be avoided, and the disadvantage such as the failure of synchronization on the receiving side can be prevented.

INDUSTRIAL APPLICABILITY

As described above, since the data multiplexing apparatus according to this invention can obtain a plurality of outputted data by effecting the data quantity reduction processing on the data stored in a plurality of buffers in response to the respective data quantities and can obtain multiplexed data by multiplexing a plurality of outputted data, the present invention may be suitably applied to a digital satellite broadcasting system in which video and audio signals are digitally compression-coded according to the MPEG standard or the like and the bit stream obtained by the multiplexing according to the MPEG standard or the like can be transmitted through the satellite.

The invention claimed is:

1. A data multiplexing apparatus comprising:
   a plurality of buffers for respectively storing a plurality of inputted data, each of said plurality of buffers including a start sync code detecting section, a serial data buffer and a byte alignment section;
   a storage quantity detecting means for detecting data storage quantities of said plurality of buffers;
   output data generating means for generating a plurality of outputted data by effecting a data quantity reduction processing on data stored in said plurality of buffers; and
   data multiplexing means for obtaining multiplexed data by multiplexing said plurality of outputted data.

2. A data multiplexing apparatus as claimed in claim 1, wherein said output data generating means generates said plurality of outputted data by effecting a data quantity reduction processing on the data stored in said plurality of buffers in response to the data storage quantities of said plurality of buffers and the transmission rate concerning said multiplexed data.

3. A data multiplexing apparatus as claimed in claim 1, wherein said output data generating means generates said plurality of outputted data by effecting a data quantity reduction processing on the data stored in said plurality of buffers in response to the data storage quantities of said plurality of buffers and priorities of said plurality of inputted data.

4. A data multiplexing apparatus as claimed in claim 1, wherein said plurality of inputted data are data compressed by using a discrete cosine transformation and said output data generating means reduces said data quantity by discarding high-order coefficients of said discrete cosine transformation.

5. A data multiplexing apparatus as claimed in claim 1, wherein said output data inputted data are parallel data of byte unit and said buffers are serial buffers and said data multiplexing apparatus further comprises parallel-to-serial converting means for converting said inputted data in the form of parallel data of byte unit to serial data and serial-to-parallel converting means for converting data read out from said buffer in the form of serial data to parallel data of byte unit and wherein said output data generating means reduces said data quantity by selectively reading out data stored in said serial data buffer.

6. A data multiplexing apparatus as claimed in claim 5, wherein said inputted data are MPEG2 encoded data and said start sync code detecting section detects a start sync code from said encoded data and said byte alignment section controls said serial-to-parallel converting means based on a detected output from said start sync code detecting section such that said outputted data complete byte data in front of said start sync code.

7. A data multiplexing apparatus as claimed in claim 1, wherein said inputted data is parallel data of one byte width and said buffer is a parallel data buffer and said data multiplexing apparatus further comprises a data analyzing section for analyzing said inputted data and generating data indicative of validity or invalidity of bit data of each byte stored in said parallel data buffer in response to a plurality of data reduction ratios and a plurality of bit enable buffers for respectively storing said data indicative of validity or invalidity generated in response to said plurality of data reduction ratios and wherein said output data generating means selects any one of said plurality of bit enable buffers in response to said buffer data storage quantity and outputs said outputted data by only producing valid bit data from the bit data of each byte of data read out from said buffer on the basis of data from said selected bit enable buffer.

8. A data multiplexing apparatus as claimed in claim 7, wherein said inputted data are MPEG2 encoded data and said data multiplexing apparatus further comprises start code detecting means for detecting a start code from said encoded data and byte alignment means for controlling said outputted data on the basis of the detected output from said start code detecting means such that byte data are completed in front of said start code.

9. A data multiplexing method comprising the steps of:
   storing a plurality of inputted data in a plurality of buffers, each of said plurality of buffers including a start sync code detecting section, a serial data buffer and a byte alignment section;
   detecting storage quantities of said plurality of buffers;
   obtaining a plurality of outputted data by effecting a data quantity reduction processing on the data stored in said plurality of buffers in response to the data storage quantities of said plurality of buffers; and
   generating multiplexed data by multiplexing said plurality of outputted data.

10. A data multiplexing apparatus as claimed in claim 9, wherein said process for generating said plurality of outputted data generates a plurality of outputted data by effecting a data quantity reduction processing on the data stored in said plurality of buffers in response to the data storage quantities of said plurality of buffers and a transmission rate concerning said multiplexed data.

11. A data multiplexing apparatus as claimed in claim 9, wherein said process for generating said plurality of outputted data generates a plurality of outputted data by effecting a data quantity reduction processing on the data stored in said plurality of buffers in response to the data storage quantities of said plurality of buffers and priorities of said plurality of inputted data.

12. A data multiplexing apparatus as claimed in claim 9, wherein said plurality of inputted data are data compressed by using a discrete cosine transformation and said process for generating said plurality of outputted data reduces said data quantity by discarding high-order coefficients of said discrete cosine transformation.

13. A data multiplexing apparatus as claimed in claim 9, wherein said inputted data are parallel data of byte unit and said buffer is a serial data buffer and said data multiplexing method further comprises the steps converting said inputted data in the form of parallel data of byte unit to serial data and inputting said serial data into said buffer and converting the data read out from said buffer in the form of serial data to parallel data of byte unit and generating said parallel data as said outputted data and wherein said process for generating said plurality of outputted data reduces said data quantity by selectively reading out stored data from said serial data buffer in response to the data storage quantity of said buffer.

14. A data multiplexing apparatus as claimed in claim 13, wherein said inputted data are MPEG2 encoded data and said plurality of buffers detect said start sync code from said encoded data and control said outputted data on the basis of said detected start sync code such that byte data is completed in front of said start sync code.

15. A data multiplexing apparatus as claimed in claim 9, wherein said inputted data are parallel data of one byte width and said buffer is a parallel data buffer and said data multiplexing method further comprises the steps of generating data indicative of validity or invalidity of bit data of each byte stored in said parallel data buffer and storing said data indicative of said validity or invalidity generated in response to said plurality of data reduction ratios in a plurality of bit enable buffers and wherein said process for obtaining said plurality of outputted data selects any one of said plurality of bit enable buffers in response to said buffer data storage quantity and generating said outputted data by reading only valid bit data from the bit data of each byte of the data read out from said buffer on the basis of data from said selected bit enable buffer.

16. A data multiplexing apparatus as claimed in claim 15, wherein said inputted data are MPEG2 encoded data and said data multiplexing method further comprises the steps of detecting a start code from said encoded data and controlling said outputted data on the basis of said detected start code such that byte data are completed in front of said start code.

17. A data transmitting apparatus including a data multiplexing section for generating multiplexed data by multiplexing a plurality of inputted data and a data transmitting section for transmitting said multiplexed data, said data multiplexing section comprising:

a plurality of buffers for storing a plurality of inputted data, each of said plurality of buffers including a start sync code detecting section, a serial data buffer and a byte alignment section;

a storage quantity detecting means for detecting data storage quantities of said plurality of buffers;

output data generating means for generating a plurality of outputted data by effecting a data quantity reduction processing on data stored in said plurality of buffers in response to data storage quantities of said plurality of buffers; and data multiplexing means for obtaining multiplexed data by multiplexing said plurality of outputted data.

18. A data transmitting apparatus according to claim 17, further comprising a plurality of encoders for generating a plurality of inputted data.

* * * * *